Oct. 5, 1943.    U. FINZI    2,330,821
GRADUAL SPEED CHANGING DEVICE
Filed June 8, 1940    4 Sheets-Sheet 1

INVENTOR.
UMBERTO FINZI
BY Edgar Luzzatto
AGENT

INVENTOR.
UMBERTO FINZI
BY Edgar Luzzatto
AGENT

Oct. 5, 1943.  U. FINZI  2,330,821
GRADUAL SPEED CHANGING DEVICE
Filed June 8, 1940  4 Sheets-Sheet 3

INVENTOR.
UMBERTO FINZI
BY Edgar Lusier
AGENT

INVENTOR.
UMBERTO FINZI

Patented Oct. 5, 1943

2,330,821

UNITED STATES PATENT OFFICE 2,330,821

GRADUAL SPEED CHANGING DEVICE

Umberto Finzi, Toulouse, France; vested in the Alien Property Custodian

Application June 8, 1940, Serial No. 339,411
In France June 16, 1939

5 Claims. (Cl. 74—282)

This invention relates to a power transmission device capable of connecting a driving shaft to a driven shaft with a variable speed ratio.

An object of my invention is to provide a power transmission device comprising only constant mesh gearings, the speed ratio whereof may assume any value within a certain range; and wherein the passage from any value of the speed ratio to any other takes place gradually without any discontinuity or steps.

Another object of my invention is to provide a device of the kind described which operates automatically within a certain range, so that whenever the ratio of the resisting torque to the driving torque varies the speed ratio automatically changes and an optimum value thereof corresponding to the new torque ratio is immediately attained; and the operation whereof, however, can be concurrently controlled and modified at will by an operator.

Other objects and advantages of my invention will become apparent as the description proceeds.

According to the general principle of my invention, the driving power is decomposed in two parts by means of epicyclic gear trains with two degrees of kinematic freedom; these two separate parts of the driving power are then conveyed onto the driven shaft by means of other epicyclic gear trains; and between two or more conveniently connected epicyclic gear trains there is arranged a device comprising two members which revolve at different speeds, said device permitting to control at will and gradually the speed ratio of the transmission.

For this purpose I may employ purely mechanical means, such as a friction clutch wherein a certain amount of slippage is permitted; or electro-mechanical means, such as an electric motor having a revolving armature and a revolving inductor. I will use thereafter the generic expression "slip device" to denote any device of such kind.

In order that the spirit of my invention may be better understood, the following description will comprise a brief theoretical discussion of the interrelationship of the speeds of the three members of a generic epicyclic gearing.

The velocities of the three members of an epicyclic train may be plotted in a system of rectangular axes in such a way that they will be represented by three straight lines having one point in common. In the appended diagrams all the speeds are plotted versus the ratio of two of them taken as abscissa, so that:

$$x=\frac{n_2}{n_1}$$

Figure 1:
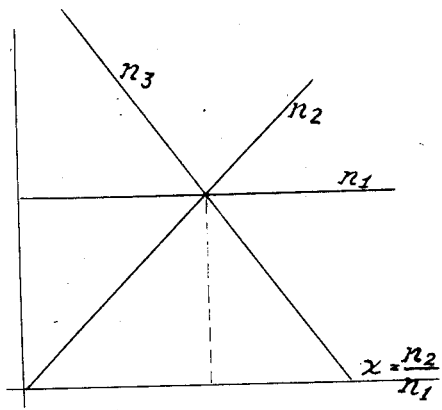
Figs. 1 to 5 are generic speed diagrams of epicyclic trains, to be used in the aforesaid theoretical discussion. The speeds are denoted by the letter $n$.

In Fig. 1, $n_1$ remains constant, $n_2$ varies from 0 to 1 (the latter being the point common to all of the three lines); then $n_3$ will be represented by a straight line passing through the point where the first two lines meet. The work furnished to the first member of the train is transmitted to the other two members proportionally to the speeds thereof.

Figure 2:
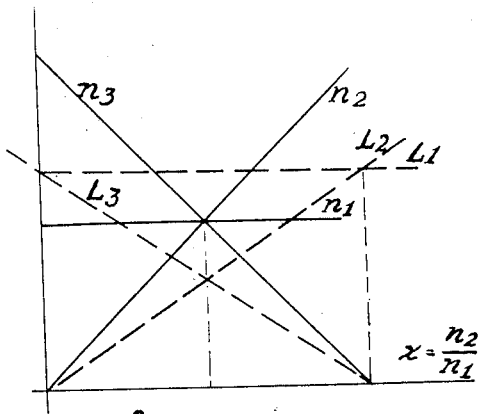

Fig. 2 shows how the work $L_1$ furnished to the member having the speed $n_1$ is apportioned among the two members having the speeds $n_2$ and $n_3$. The sum of the three works is always zero, that is the equation: $L_1+L_2+L_3=0$ always holds; and $L_1$, $L_2$, $L_3$ may be the work of three motors having respectively the speeds $n_1$, $n_2$, $n_3$.

Figure 3:
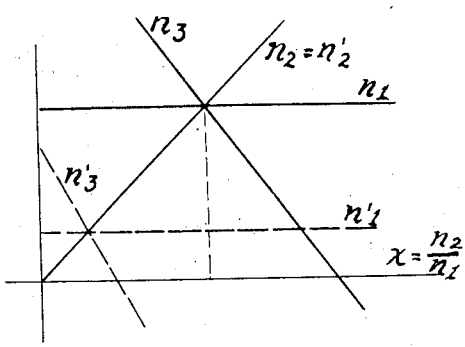

If by means of an ordinary gearing the speed $n_1$ is reduced to $n_1'$ (see Fig. 3), speed of a member of another epicyclic gear train, and if the speed of the second member of this other train is: $n_2'=n_2$, the speed of the third member will be represented by the line $n_3'$ passing through the point where $n_1'$ and $n_2'$ meet.

Inversely, $n_3$ and $n_3'$ may represent the speeds of a variable speed source of power, which may be connected through a third epicyclic gear train to the driving or the driven shaft, by means of an ordinary or an electro-mechanical transmission. These two cases have been represented in Figs. 4 and 5.

Figure 4:
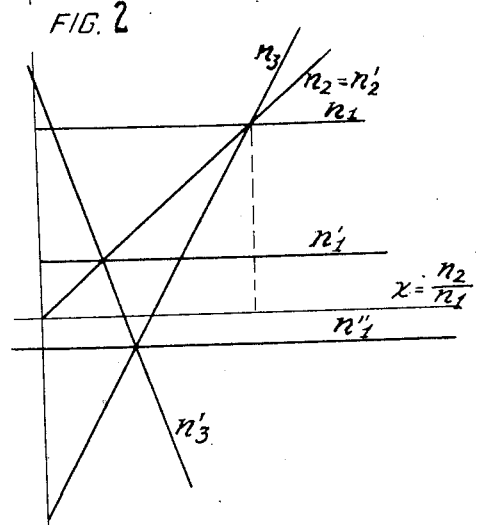
Figure 5:
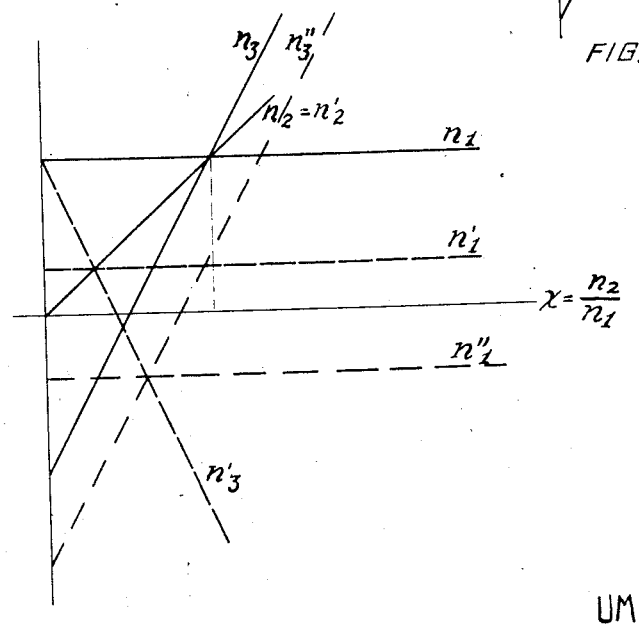

In Fig. 4 the composition of the speeds $n_3$ and $n_3'$ is accomplished by a third train one of the members whereof has the speed $n_1''$ proportional to the speed $n_1$ of the motor. In Fig. 5 one of the members of the third train, instead of having the speed $n_3$, has a speed $n_3''$ represented by a parallel to $n_3$, so that it is: $n_3''-n_3=$constant.

We may suppose that $n_3$ and $n_3''$ represent the absolute speeds of two members capable of having a slip with respect to one another, such as for instance the armature and the inductor of a motor; then a certain amount of power will be transmitted from $n_3''$ to $n_3$, if the motor is fed by means of the current furnished by a constant speed generator.

Figure 6:
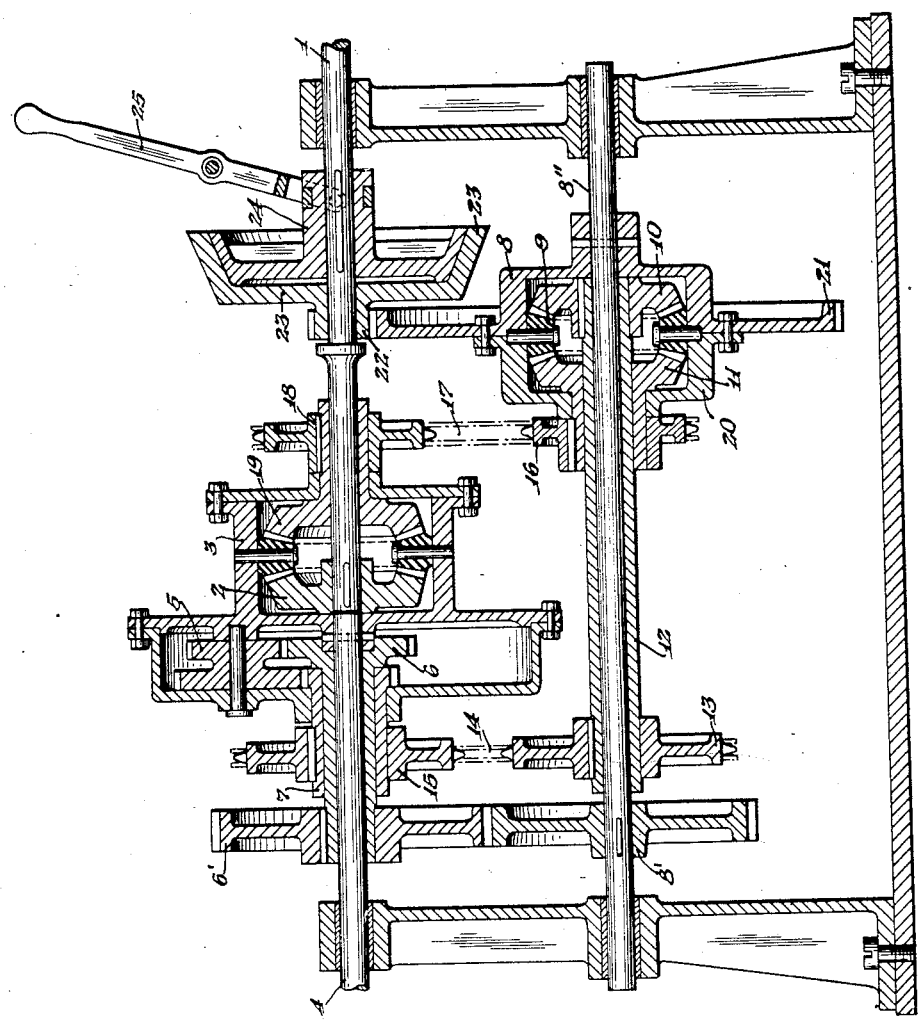

By way of example, Fig. 6 shows a variable speed transmission constructed according to my invention and comprising three epicyclic gear trains. Referring to Fig. 6, the numeral 1 denotes the driving shaft to which is fastened the bevel gear 2 of the first epicyclic train. The velocity of said shaft and bevel gear is represented by $V_1$ and is supposed to be constant (and equal to 1) in the diagram of Fig. 7. This supposition should never be construed as a limitation, as all the embodiments of my invention can be applied equally well to variable speed motors, such as internal combustion engines. In this case, to every value of the speed of the driving shaft there correspond an infinity of values of the speed of the driven shaft; and the variations of the driving velocity are superimposed on the variations of the transmission's speed ratio.

The frame 3 of the first gear train is fastened to the driven shaft, the speed whereof is represented by $V_2$ which varies together with $$x = \frac{V_2}{V_1}$$

Said frame 3 carries the planetary gears 5 at the same speed $V_2$.

These planetary gears mesh with the pinions 6 and 7 which turn loosely on the driven shaft 4 and carry the gear 6' and the sprocket 15 fastened thereto. The frame 3 also encloses the bevel gear 19 which runs freely on the shaft 1 and is keyed to the shaft 18. On the same shaft 1 turns loosely the pinion 22 which is fastened to the bell 23 of a conical friction clutch; the cone 24 of said clutch is keyed to the shaft 1 by means of a slidable key; thus by operating the lever 25 the cone clutch can be thrown in and out of engagement and the slip between 23 and 24 may be controlled.

Figure 7:
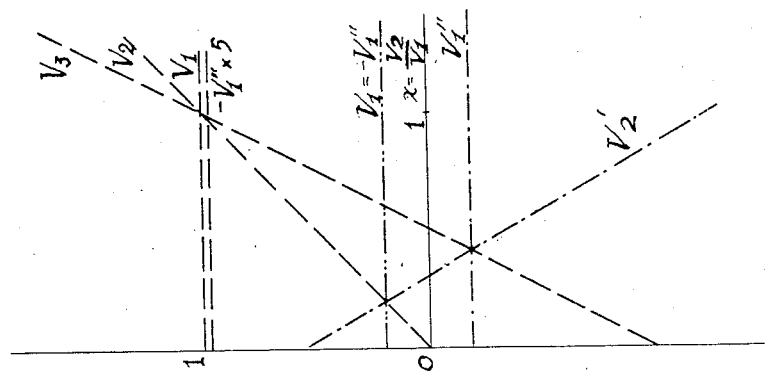
Fig. 6 is a longitudinal section of a mechanical embodiment of my invention and Fig. 7 is the speed diagram relating thereto, wherein the speeds are denoted by the letter V.

The pinion 22, driven by the bell 23, transmits the power to the frame 8 of another epicyclic gear train through the gear 21, fastened to the frame and shaft 8''. The frame 8, by means of the planetary gears 9, carries the bevel gears 10 and 11 in revolution; and these latter, in turn, are fastened to the sprockets 13 and 16, the speed whereof is represented in the diagrams of Fig. 7 by the straight lines $V_2'$ and $V_3$.

As the bevel gear 19 and the sprocket 18 fastened to each other also revolve at the speed $V_3$, they may be coupled through the chain 17 with the bevel gear 11 and the sprocket 16, with a speed ratio of 1/1. Similarly, as the pinion 7 and the sprocket 15 fastened to each other revolve at the speed $V_2'$, they may be connected through the hollow shaft 12 and the chain 14 to the bevel gear 10, with a speed ratio of 1/1. In turn, as the frame 8 revolves at the speed $V_1''$ and the rigidly coupled gear 6 and 6' revolve at the speed $V_1'$, and since the speeds $V_1'$ and $V_1''$ are equal in magnitude and opposite in direction, said case 8 may be connected to said gears 6, 6' through the gear coupling 6'—8', the gear 8' being fastened to the frame 8.

The device operates as follows: When the motor runs and the driven shaft does not turn, there is a slippage between the two members of the cone clutch 23—24. This slip is represented in Fig. 7 by $V_1$ minus $(-V_1''.5)$, because in the described assemblage the gear ratio of the coupling 21—22 is 1/5; the gear ratios have been chosen in such a way that $V_1''$ is not parallel to the axis of the abscissae, but very slightly divergent.

As the cone 24 is pressed against the bell 23, the driving shaft transmits to the frame 8 a part of the driving power, while the rest of the power is transmitted directly through the bevel gear 2 to the frame 3, that is to the driven shaft which is fastened thereto.

As the pressure of 24 on 23 is increased, a greater portion of the motor's power is transmitted through the secondary shaft 8'', which, by means of the transmission arrangements 8'—6', 13—14—15, and 16—17—18, transmits the power received to the driven shaft through the epicyclic gears located in the frame 3, with a low speed ratio.

If the pressure between 23 and 24 is increased, the slip between these two elements decreases and consequently the driven shaft accelerates until a state of equilibrium is reached between the external resisting torque applied to the driven shaft, the driving torque, and the torque transmitted through the friction clutch due to the pressure of 24 on 23.

If the resisting torque, for any reason whatsoever, tends to increase, and if the pressure of 24 on 23 remains constant, the slip between 23 and 24 increases and the speed of the driven shaft diminishes until a new state of equilibrium is attained; and this action is substantially automatic for wide enough variations, as the slip of the friction clutch is proportional with a sufficient approximation to the pressure exerted by the members 23 and 24 on each other.

In conclusion, the friction clutch operates as an apportioner of the power among the direct transmission through the shaft 1 and the bevel gear 2 and the reduced speed transmission 8, overloading this latter when the resisting torque of the driven shaft increases. A manual non-automatic control of the transmission is afforded by the lever 25, and this manual control may be superimposed on and coact with the automatic speed control previously described.

An electro-mechanical transmission constructed along the lines of the diagram of Fig. 5, will operate in an analogous manner. If between $n_3$ and $n_3''$ (Fig. 5) there is inserted an asynchronous rotating field motor with inductor and armature both revolving, and if the inductor is fed with the current generated by a constant speed alternator, a torque is transmitted between $n_3$ and $n_3''$ which conveys the power to the members $n_1''$—$n_3'$—$n_3''$, to the driven shaft and to the driving shaft. If the relative speed $n_3$—$n_3''$ is not exactly constant, but variable from 0 to 10%, the torque transmitted from inductor to armature increases automatically as the resistance on the driven shaft increases. The driven shaft has a tendency to slow down while the driving shaft maintains its constant speed. However, during the period of the starting of the driven shaft, it would suffice to control the excitation of the alternator which feeds the asynchronous motor inserted between $n_3$ and $n_3''$, whereby the torque transmitted from inductor to armature is also controlled.

Figure 9:
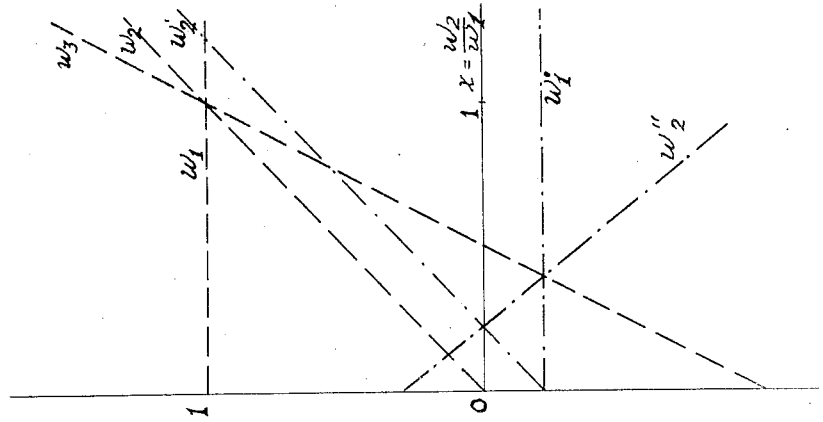
Figure 8:
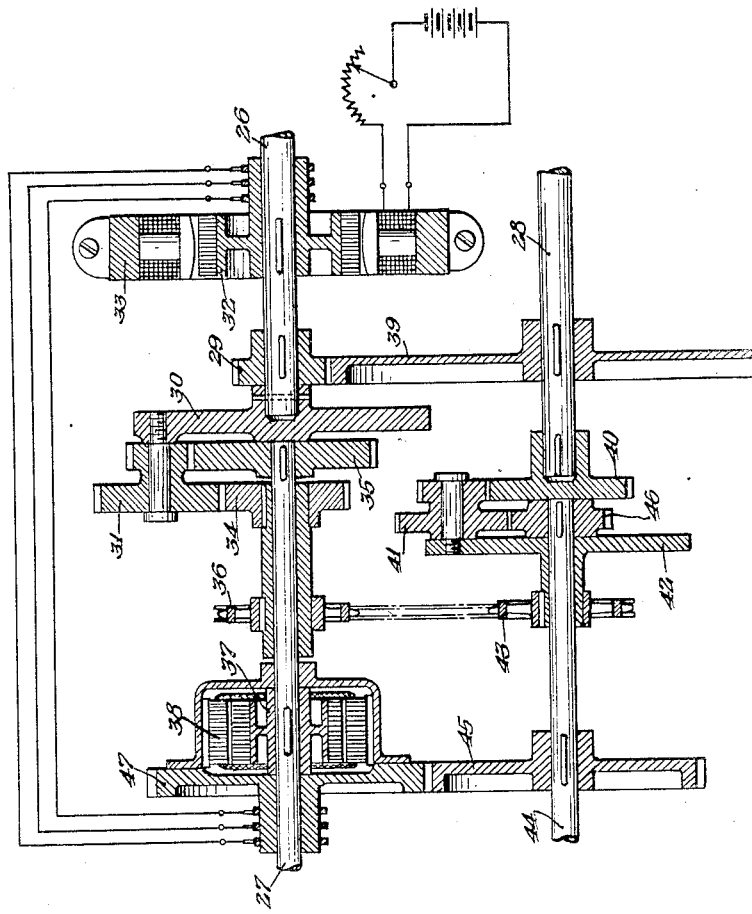
Figs. 8 and 10 are longitudinal sections of electro-mechanical embodiments of my invention and Figs. 9 and 11 respectively are the speed diagrams relating thereto. The speeds are denoted by the letter $w$ in Fig. 9 and by the letter $v$ in Fig. 11.

Fig. 8 shows one such electro-mechanical embodiment of my invention. Therein, the driving shaft, which is denoted by the numeral 26, revolves at the speed $w_1$ which is constant and has been made equal to 1 in the diagram of Fig. 9.

The driven shaft 27 has the variable speed $w_2$. An auxiliary shaft 28 turns at the speed $w_1'$ which is a fraction of $w_1$.

To the driving shaft 26 are fastened the gear 29 and the supporting member or frame 30 which carries the pinions 31; and on the same shaft 26 is also keyed the armature 32 of an alternator, the stator whereof is denoted by the numeral 33; therefore the members 29, 30, 32 all turn at the speed $w_1$. The planetary pinions 31 mesh with the pinions 34 and 35. The armature 37 of an electric motor is keyed to the shaft 27 and therefore revolves at the speed $w_2$.

The gear 34 and the sprocket 36, rigidly connected to each other, run freely on the shaft 27 at the speed $w_3$. The shaft 27 also carries at the speed $w_2$ the armature 37 of an asynchronous motor.

The inductor 38 of said motor turns loosely on the shaft 27 at the speed $w_2'$. The gears 39 and 40 are fastened to the shaft 28 and revolve therefore at the speed $w_1'$ which is maintained in a constant ratio to the speed $w_1$ of the shaft 26 by the gear coupling 29—39. The pinion 40 meshes with the planetary pinion 41 which is pivoted to the frame 42. This latter is fastened to the sprocket 43 and turns loosely on the shaft 44 together with said sprocket.

The shaft 44 revolves with the speed $w_2''$ and has the gears 45 and 46, which revolve therefore at the same speed $w_2''$. The gear ratios of the connection 40—46—41 have been chosen in such a way as to give to the frame 42 and the sprocket 43 the same speed $w_3$ of the gear 34. The gear 45 meshes with the gear 47 which is rigidly connected to the inductor 38, and the sprockets 36 and 43 are coupled by means of a chain. The speed ratios are such that 47 revolves at the speed $w_2'$ while 36 revolves at the speed $w_3$.

The device operates as follows.

The driving shaft 26 revolves at the constant speed $w_1$ and it carries the armature 32. If there is no exciting current in the stator 33, no torque is transmitted to the driven shaft 27.

As the stator 33 is supplied with an exciting current, the armature 32 furnishes an electric current which is conveyed through a suitable line to the inductor 38: then a torque is transmitted from 37 to 38. These two members however have different speeds, as 37 turns at the speed $w_2$ and 38 at the speed $w_2'$. This means that in the inductor 38 there is created a rotating or Ferraris field, the absolute speed whereof is represented by $w_2$; and that, because of this rotating field, the armature 37 fastened to the shaft 27 revolves under the action of a torque which will become stronger with any increase of the exciting current in the stator 33.

While the shaft 26 carries the armature 32, it also carries the planetary pinions 31 which mesh with 34 and 35 and transmit the driving torque to the driven shaft 27 and also through 34, through the members 36 and 43, to the member 42. Meanwhile, the driving shaft 26 through the gear coupling 29—39 drives the shaft 28 into revolution at the constant speed $w_1'$.

As a consequence of the arrangement adopted, the work transmitted to the shaft 28 is divided by the gear train 40—41—46 into two portions, whereof one is transmitted to the shaft 44 and therefrom through a direct coupling to the inductor 38, and the other to the sprocket 43 and therefrom through a direct coupling to the sprocket 36.

The speed of the various members of the device will be such as is required to bring about the equilibrium of all the external torques applied thereto, that is: the resisting torque on the shaft 27; the driving torque on the shaft 26; and the braking torque between 32 and 33 due to the excitation of the alternator.

If this last torque and the driving torque remain constant, the speed of the shaft 27 will assume the value whereby the work of the resisting torque becomes equal to that of the driving torque, except for the amount of work lost in the transmission.

Figure 11:
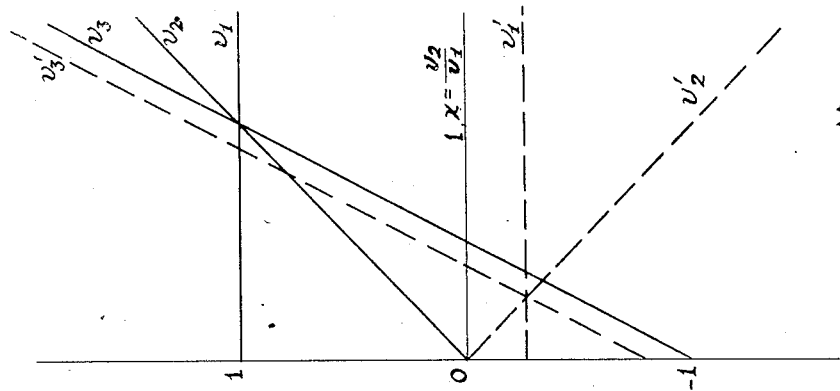
Figure 10:
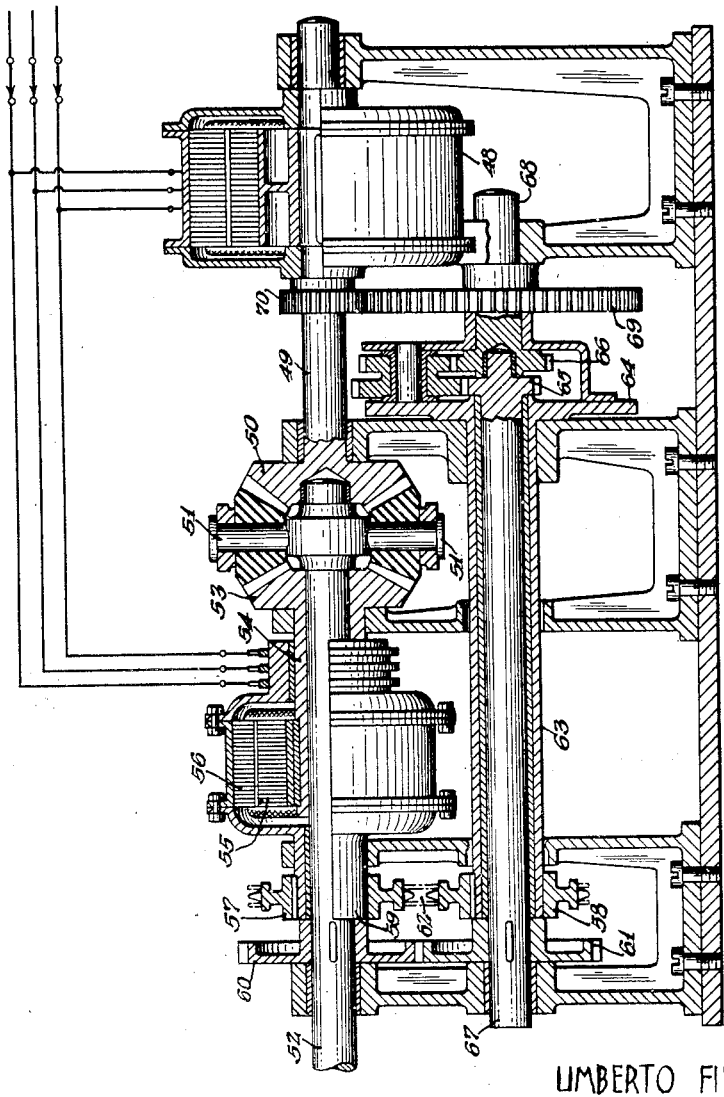

My transmission can also be fed from an external line; in this case the alternator 32—33 will operate as a synchronous motor, or will be replaced with an asynchronous motor of suitable power. An embodiment of this type is illustrated in Figs. 10 and 11.

The prime motor 48, fed from the main electric line, drives the shaft 49 and the sun gear 50 at the constant speed $v_1$. The driven shaft 52 with the planetary pinions 51 revolves at the variable speed $v_2$. The sun gear 53, the hollow shaft 54, and the armature 55 of the secondary motor, also fed from the main line, revolve at the speed $v_3$. The inductor 56 of the secondary motor, the hollow shaft 59, and the sprocket 57 revolve at the speed $v_3'$ differing from $v_3$ by a constant amount.

The same speed $v_3'$ is transmitted in the ratio 1/1 from the sprocket 57 through the chain 62, the sprocket 58, and the hollow shaft 63, to the frame 64 of a second epicyclic gear train. The sun pinion 65 of said second train is fastened to the shaft 67 and is connected with a speed ratio of $-1/1$ to the driven shaft 52 through the gearing 60—61: it turns therefore at the speed $v_2' = -v_2$. The other sun pinion 66 of the same train is fastened to the shaft 68 connected to the driving shaft through the gear coupling 69—70: it revolves therefore at a constant speed $v_1'$ proportional to the speed $v_1$ of said driving shaft. The operation of the device is similar to that previously described.

In this last and in analogous forms, my device can operate as the "controller" of electric traction vehicles, such as trolley cars, electric locomotives, and even electric automobiles; and can generally be useful in all the cases wherein a variable speed and an easy start are desired, whether the motor be an electric or a mechanical one.

The many advantages and possible applications of my invention will now be apparent to the persons skilled in the art to which it appertains.

While I have described in the foregoing certain preferred embodiments of my invention, I do not intend to be limited to the details herein set forth. A person skilled in the construction of this class of mechanical and electro-mechanical devices, will be able to devise many variations, modifications, and adaptations, which do not involve any departure from the spirit of my invention and from the scope of the appended claims.

I claim:

1. A power transmission device with a gradually and automatically variable speed ratio, comprising, in combination with a driving shaft and a driven shaft, a main transmission comprising at least one epicyclic gear train with two degrees of kinematic freedom; a secondary transmission comprising at least one other epicyclic gear train with two degrees of kinematic freedom; means for operatively connecting members of said main and secondary transmissions; and a slip device comprising two elements capable of transmitting a torque from one another while revolving at different speeds, one of said elements being associated with a constant speed ratio to one of the shafts of said main transmission and the other of said elements being associated with a constant speed ratio to one of the shafts of said secondary transmission, whereby the speed ratio of the transmission device becomes automatically adjusted to the variations of the resisting torque on the driven shaft.

2. A power transmission device with a gradually, automatically, and manually variable speed ratio, comprising in combination with a driving shaft and a driven shaft a main transmission comprising at least one epicyclic gear train; a secondary transmission comprising at least one other epicyclic train; means for operatively connecting members of said main and secondary transmissions; a slip device comprising two elements capable of transmitting a torque from one another while revolving at different speeds, one of said elements being associated with a constant speed ratio to one of the shafts of said main transmission and the other of said elements being associated with a constant speed ratio to one of the shafts of said secondary transmission, whereby the speed ratio of the transmission device automatically becomes adjusted to the variations of the resisting torque on the driven shaft; and means for manually controlling the ratio of the torque transmitted from the one to the other element of said slip device to the difference of speed thereof, whereby the speed ratio of the transmission device is also manually controlled.

3. In a power transmission device with a gradually, automatically, and manually variable speed ratio, the combination with a driving shaft and a driven shaft of a main transmission comprising a number of epicyclic gear trains; a secondary transmission comprising at least one other epicyclic train; means for operatively connecting members of said main and secondary transmissions; a friction clutch, one of the elements thereof being connected to one of said epicyclic trains and the other element thereof being connected to another of said epicyclic trains; and means for controlling the mutual pressure of said two elements of said friction clutch on one another.

4. In a power transmission device with a gradually, automatically, and manually variable speed ratio, the combination with a driving shaft and a driven shaft of a main transmission comprising a number of epicyclic gear trains; a secondary transmission comprising at least one other epicyclic train; means for operatively connecting members of said main and secondary transmissions; an electro-mechanical clutch comprising a rotating inductor operatively connected to one of said epicyclic train and a rotating armature operatively connected to another of said epicyclic trains; and means for feeding said electro-mechanical clutch with a controllable current.

5. In a power transmission device with a gradually, automatically, and manually variable speed ratio, the combination with a driving shaft and a driven shaft of an alternator actuated by said driving shaft; means for controlling the excitation of said alternator; a main transmission comprising a number of epicyclic gear trains; a secondary transmission comprising at least one other epicyclic train; means for connecting members of said main and secondary transmissions; an electro-mechanical clutch comprising a rotating inductor fed by said alternator and connected to one of said epicyclic trains and a rotating armature connected to another of said epicyclic trains; the difference of the speeds of revolution of said inductor and armature being a substantially constant fraction of the speed of said alternator.

UMBERTO FINZI.